US 12,508,836 B2

(12) United States Patent
Guinea

(10) Patent No.: US 12,508,836 B2
(45) Date of Patent: Dec. 30, 2025

(54) RETENTION DEVICE AND A METHOD OF USE THEREOF

(71) Applicant: Rim-Lock Innovations Pty Ltd, Moranbah (AU)

(72) Inventor: Joseph Kent Guinea, Moranbah (AU)

(73) Assignee: Rim-Lock Innovations Pty Ltd., Moranbah (AU)

(*) Notice: Subject to any disclaimer, the term of this patent is extended or adjusted under 35 U.S.C. 154(b) by 155 days.

(21) Appl. No.: 18/252,785

(22) PCT Filed: Oct. 27, 2021

(86) PCT No.: PCT/AU2021/051251
§ 371 (c)(1),
(2) Date: May 12, 2023

(87) PCT Pub. No.: WO2022/099348
PCT Pub. Date: May 19, 2022

(65) Prior Publication Data
US 2024/0001708 A1 Jan. 4, 2024

(30) Foreign Application Priority Data
Nov. 13, 2020 (AU) ................ 2020904163

(51) Int. Cl.
*B60B 3/14* (2006.01)
*F16B 2/14* (2006.01)
(52) U.S. Cl.
CPC ............ *B60B 3/14* (2013.01); *F16B 2/14* (2013.01); *F16B 2200/83* (2023.08)
(58) Field of Classification Search
CPC .. B60B 3/14; B60B 3/16; B60B 23/02; B60B 23/10; B60B 3/165; B60B 23/00; F16B 2/14; F16B 2200/83; F16B 5/0621
See application file for complete search history.

(56) References Cited

U.S. PATENT DOCUMENTS 1,013,273 A   1/1912   Byam
3,790,217 A   2/1974   DeRegnaucourt
(Continued)

FOREIGN PATENT DOCUMENTS

AU   2017261496 A1   5/2018
EP      3533620 A1   9/2019
(Continued)

OTHER PUBLICATIONS

Extended European Search Report in EP 21890380.5, mailed Jun. 25, 2024, 6 pages.
(Continued)

*Primary Examiner* — Sarang Afzali
*Assistant Examiner* — Darrell C Ford
(74) *Attorney, Agent, or Firm* — Kilpatrick Townsend & Stockton LLP

(57) ABSTRACT

The present invention relates to a retention device and method of use thereof for fitting wheel rims. In one form, there is provided a retention device including: a body having a mounting end and an opposed outer end and defining a receiving opening extending from the mounting end at least partially towards the outer end, said receiving opening configured to at least partially receive the wheel stud therein; a plurality of wedge elements aligned and arranged within the body to engage with the wheel stud; and a magnetic member positioned at the mounting end of the body, said magnetic member configured to magnetically mount the retention device to a nave plate of a wheel rim.

20 Claims, 6 Drawing Sheets

(56) References Cited

U.S. PATENT DOCUMENTS

| | | | |
|---|---|---|---|
| 4,225,191 A | 9/1980 | Knoski | |
| 4,834,464 A * | 5/1989 | Frehse | F16C 33/723 |
| | | | 384/624 |
| 6,264,284 B1 | 7/2001 | Lees | |
| 6,712,574 B1 | 3/2004 | Roopnarine | |
| 7,856,774 B1 | 12/2010 | Sorkin | |
| 8,257,004 B2 * | 9/2012 | Smith | F16B 37/0857 |
| | | | 403/109.5 |
| 10,202,753 B2 * | 2/2019 | Espinosa | E04B 1/4128 |
| 2003/0185651 A1 * | 10/2003 | Lees | F16B 39/16 |
| | | | 411/432 |
| 2007/0286702 A1 | 12/2007 | Smith | |
| 2015/0298503 A1 * | 10/2015 | Pomp | B60B 37/10 |
| | | | 301/105.1 |
| 2018/0065411 A1 | 3/2018 | Ryshavy et al. | |
| 2019/0241014 A1 | 8/2019 | Herrmann et al. | |
| 2019/0264765 A1 * | 8/2019 | Juzswik | G01B 5/0028 |
| 2020/0173775 A1 * | 6/2020 | Banchs | F16B 1/00 |
| 2021/0283948 A1 * | 9/2021 | Mica | B25B 23/0007 |

FOREIGN PATENT DOCUMENTS

| | | |
|---|---|---|
| GB | 305520 | 2/1929 |
| JP | 2007-276617 A | 10/2007 |

OTHER PUBLICATIONS

International Search Report in PCT/AU2021/051251, mailed Feb. 1, 2022, 5 pages.

* cited by examiner

RETENTION DEVICE AND A METHOD OF USE THEREOF

TECHNICAL FIELD

The present invention relates to a retention device and method of use thereof for fitting wheel rims.

BACKGROUND

Retention devices are commonly used when securing wheel rims to wheel rotors. Typically, a wheel rim positioned on a wheel hub will ultimately need to be securely fastened by wheel nuts. Numerous wheel nuts may be required to fasten the wheel rim by securely locking each threaded element extending from the wheel hub. A typical mid-size automobile may require the use of five or six wheel nuts on a 14 to 19 inch wheel. However, large mining machinery may require the use of upwards of 60 or more wheel nuts on wheels rims as large as 63 inches.

While smaller automobile wheels may be easily lifted and fitted by a single person, fitting larger wheels for trucks or mining equipment requires multiple persons or even the use of heavy machinery. These operations risk injury to personnel if the wheel is not safely retained during all phases of installation. A particular point of risk is when the wheel rim is seated onto the wheel hub but not yet secured by wheel nuts.

U.S. Pat. No. 3,790,217 discloses the use of key hole slots on a rim assembly which attaches to threaded fasteners with wheel nuts already applied. This reduces the likelihood of the rim assembly inadvertently falling off the wheel. However, U.S. Pat. No. 3,790,217 requires each rim to have custom cut-outs that match each wheel. This is limiting on the modularity of the invention and also weakens the wheel rim as material is removed. Furthermore, such slotted features would not be suitable for locations such as the wheel rim and rotor contact point where high torque and start stop forces are experienced.

U.S. Pat. No. 7,856,774 discloses a tendon retention device using two split halves of a frustoconical retainer which clamps down when an external sheath is moved in one direction. This principal of cable retention has been applied in various areas of practice when a cable needs to be tensioned or anchored. However, this device is typically used on long lengths of cable and is designed to clamp down and bite into the material surface. This would not be suitable for short lengths of threaded fasteners such as wheel studs typically projecting from wheel hubs. Further, the indiscriminate clamping effect risks damaging the wheel studs.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a retention device and method of use thereof, which may at least partially address one or more of the problems or deficiencies mentioned above or which may provide the public with a useful or commercial choice.

According to a first aspect of the present invention, there is provided a retention device for retaining a wheel rim relative to a wheel hub having at least one wheel stud extending therefrom, said device including:

- a body having a mounting end and an opposed outer end and defining a receiving opening extending from the mounting end at least partially towards the outer end, said receiving opening configured to at least partially receive the wheel stud therein;
- a plurality of wedge elements aligned and arranged within the body to engage with the wheel stud; and
- at least one magnetic member positioned at the mounting end of the body, said magnetic member configured to magnetically mount the retention device to a nave plate of a wheel rim.

Advantageously, the retaining device of the present invention provides a safe and reliable device for retaining a wheel rim relative to a wheel hub while the wheel rim is secured in place with individual wheel lugs. Embodiments of the present invention provide a device that can be readily pressed over an externally threaded wheel stud when axially pressed together and yet constricts about the wheel stud when axially pulled away. In summary, the present invention provides an improvement to safety when fitting a wheel to a wheel hub, ensuring that the wheel, tyre, and rim assembly cannot fall off the hub once seated on the wheel studs of the hub.

As indicated above, the retention device of the present invention is configured to engage with a wheel stud and retain a wheel rim relative to a wheel hub. It will therefore be convenient to describe the device with reference to this example application. However, a person skilled in the art will appreciate that the device is capable of broader applications and may be used to engage with any threaded fastener for retaining an object relative to the threaded fastener.

A wheel rim is a cylindrical part of a vehicle wheel assembly on which the tyre is mounted. Usually, the wheel rim may be mounted to a wheel hub of a vehicle.

The wheel rim generally includes flanged outer rims between which a tyre is positioned and mounted and a central disc or nave plate having a plurality of wheel stud openings defined therein for mounting to the wheel hub.

The openings are typically arranged in a spaced arrangement about a periphery of the central disc or nave plate and are each configured to receive a wheel stud of the wheel hub therethrough.

In use, the wheel rim is mounted on the wheel hub such that each wheel stud is received through a corresponding wheel stud opening in the wheel rim.

Once mounted, the wheel rim may be secured to the wheel hub by a plurality of wheel lugs or nuts each fastened to a portion of a respective wheel stud extending through a corresponding wheel stud opening defined in the wheel rim.

The retention device of the present invention may be of any suitable size, shape and construction and may be formed from any suitable material or materials for temporarily engaging with a wheel stud and retaining a wheel rim relative to a wheel hub.

As indicated, the device includes a body having a receiving opening for at least partially receiving a wheel stud therein.

The body may be of unitary construction or may be formed from two or more body pieces, preferably the latter.

The body may include a mounting end, an opposed outer end and at least one sidewall extending therebetween, preferably longitudinally.

The at least one sidewall may be curved or rounded.

The receiving opening may be defined in the mounting end, preferably centrally defined.

The body may include any suitable cross-sectional shape. For example, the body may have a circular, oval-shaped, triangular or rectangular cross-sectional shape, preferably substantially circular.

The receiving opening may be of any suitable size and shape for receiving a wheel stud therein.

The receiving opening may extend from the mounting end at least partially towards the opposed outer end.

In some embodiments, the receiving opening may have a constant diameter.

In other embodiments, the receiving opening may taper in diameter from the opposed outer end at least partially towards the mounting end, preferably gradually. In such embodiments, the receiving opening may have a smaller diameter at or near the mounting end than a diameter at or near the opposed outer end.

In preferred embodiments, the body may be in the form of a barrel and the receiving opening may extend between and entirely through the mounting end and the opposed outer end. In such embodiments, the body may include the receiving opening defined in the mounting end, an access port defined in the opposed outer end and an internal bore in fluid communication with both the receiving opening and the access port and extending longitudinally therebetween. The access port may have a greater diameter than the receiving opening and the internal bore may taper in diameter from the access port to the receiving opening, preferably gradually.

As indicated, the device further includes a plurality of wedge elements configured to be aligned and arranged within the body for engaging with a wheel stud received therein.

Each wedge element may be of any suitable size, shape and construction to be located in the body, preferably about a periphery of the internal bore defined therein.

Generally, each wedge element may include a tip, an opposed base and a wedge body extending therebetween.

The tip may be configured to be arranged at or near the mounting end of the body. Likewise, the opposed base may be configured to be arranged at or near the opposed outer end of the body.

The wedge body may include an inner wall, an opposed outer wall and a pair of opposed sidewalls extending longitudinally between the tip and the base. The inner wall may preferably include a concave surface defined thereon.

In embodiments in which the receiving opening or internal bore tapers, each wedge element may likewise taper in width from the base to the tip so as to enable the wedge elements to be arranged about a periphery of the receiving opening or internal bore in a side-by-side arrangement.

The plurality of wedge elements may include any suitable number of wedge elements configured to be arranged about a periphery of the internal bore. For example, the plurality of wedge elements may include three, four, five, six, seven, eight, nine or even 10 wedge elements, preferably three wedge elements.

In some embodiments, the inner wall of each wedge element may further include a plurality of grooves defined thereon. The plurality of grooves may preferably extend across the concave surface of the wedge elements in a lateral direction extending at least partially between the opposed sidewalls.

Typically, the plurality of grooves may be adapted to match an external thread on the wheel stud.

In preferred such embodiments, the plurality of grooves on the wedge elements may combine to form an internal thread adapted to engage with an external thread of a wheel stud.

In some embodiments, each wedge element may include a chamfer at or near the tip to guide an external thread of a wheel stud during engagement. The chamfer may preferably be configured to guide and align a wheel stud as it is received in the receiving opening or internal bore relative to the wedge elements.

As indicated, the plurality of wedge elements may be arranged within the body for engaging with a wheel stud received therein. Typically, the wedges may be arranged in a side-by-side arrangement about a periphery of the receiving opening or internal bore.

In some embodiments, the wedge elements may be axially movable relative to the body and the receiving opening or internal bore to expand and fit about a wheel stud, when the retaining device is pressed towards the wheel hub, preferably over a wheel stud.

In such embodiments, the wedge elements may preferably be axially moveable relative to the body and the receiving opening or internal bore to constrict about a wheel stud received therein when the device is moved away from the wheel hub to advantageously prevent disengagement from the wheel stud.

In some embodiments, the device may further include one or more biasing members or mechanisms for biasing the plurality of wedge elements towards the mounting end of the device.

Any suitable biasing member or mechanism may be used. For example, the one or more biasing members or mechanisms may include one or more springs, such as, e.g., coil springs.

In some such embodiments, the one or more biasing members or mechanisms may include a spring located between the wedge elements and the outer end of the body, so that axial movement of the wedge elements towards the outer end acts against a biasing force of the one or more biasing members or mechanisms, and movement of the wedge elements towards the mounting end acts under the force of the one or more biasing members or mechanisms.

In some embodiments, the device may further include an alignment member or mechanism for aligning the wedge elements relative to each other in the body, preferably in a side-by-side arrangement.

Any suitable alignment member or mechanism may be used that is known in the art. For example, in some embodiments the alignment member or mechanism may include an O-ring or clip configured to substantially align the wedge elements relative to each other yet allow expansion when fitting about a wheel stud.

In some such embodiments, each wedge element may include a retaining groove for at least partially receiving the O-ring or clip and aligning the wedge elements relative to each other. The retaining groove may be defined in the outer wall at or near the base. The grooves may substantially align in each of the wedge elements.

In some embodiments, the device may further include a disengagement member for disengaging the plurality of wedge elements from a wheel stud, preferably for fixing the wedge elements against rotational movement relative to the body to thereby enable the device to be threaded free of the of the wheel stud.

The disengagement member may be of any suitable size, shape and form to disrupt the engagement between the wedge elements and the wheel stud.

In some embodiments, the disengagement member may be a fastener configured to be received through an opening defined in a side of the body or the outer end for fixing the wedge elements against rotational movement relative to the body and thereby enabling the device to be threaded free of the wheel stud. The disengagement member may be in the form of a grub screw or the like.

In other embodiments, the outer end of the body may define an external socket formation for engaging with a torque applying tool and may include an opening for receiving a disengagement member therethrough for fixing the wedge elements against rotational movement relative to the body and thereby enabling the device to be threaded free of the wheel stud with the torque applying tool.

In such embodiments, the disengagement member may be at least partially received in an opening defined in the rear wall of one of the plurality of wedge elements to thereby fix the wedge elements against rotational movement relative to the body.

In other such embodiments, the disengagement member may be at least partially received between adjacent wedge elements to thereby fix the wedge elements against rotational movement relative to the body.

As indicated, in some embodiments the outer end of the body may define an external socket formation for engaging with a torque applying tool.

In some such embodiments in which the outer end includes an access port, the device may further include a socket end member connectable to the opposed outer end of the body for covering the access port defined therein. The socket end member and the outer end of the body may connect in any suitable way, typically via a threaded engagement.

The socket end member by sealing the access port may retain the plurality of wedge elements in the body.

The socket end member may preferably define an external socket formation for engaging with a torque applying tool. Further, the socket end member may preferably include a locating hole defined therein and positioned to align a disengagement member received therethrough relative to the wedge elements for fixing the wedge elements as previously described.

In some embodiments, the device may further include a custom removal tool configured to engage with the socket end member for disengagement of the device from a wheel stud.

The custom removal tool may preferably include a socket engagement member sized and shaped to complementarily engage with the external socket formation.

Further, the custom removal tool may preferably include a disengagement member configured to be received through the locating hole defined in the socket end member when the custom removal tool is aligned relative to and engages with the socket end member. The disengagement member may include a tapered point for insertion through the locating hole.

As indicated, the device includes at least one magnetic member positioned at the mounting end of the body and configured to magnetically mount the retention device relative to a nave plate or central disc of a wheel rim.

Any suitable magnetic member capable of producing a substantially uniform magnetic field may be used.

In some embodiments, the at least one magnetic member may be a permanent magnet.

The magnetic member may be of any suitable size and shape and may be formed from any suitable material or materials. For example, the magnetic member may be formed from a ferromagnetic material, a composite material with magnetic powder, a ceramic or ferrite magnet, an alnico magnet or a rare-earth magnet (e.g., a samarium-cobalt or neodymium-iron-boron magnet). In some embodiments, the magnetic member may be formed from a neodymium alloy.

The at least one magnetic member may preferably be positioned about a periphery of the receiving opening.

In some such embodiments, the at least one magnetic member may include a plurality of magnetic members arranged about the periphery of the receiving opening.

In other such embodiments, the at least one magnetic member may be substantially ring-shaped and located about the periphery of the receiving opening.

According to a second aspect of the present invention, there is provided a method of retaining a wheel rim during fitting, said method including:
 mounting a plurality of retention devices according to the first aspect to a nave plate of the wheel rim; and
 pressing the wheel rim onto a wheel hub such that each of the plurality of retention devices aligns and engages with a respective wheel stud extending from the wheel hub and retains the wheel rim relative to the wheel hub.

The method may include one or more features or characteristics of the retention device as hereinbefore described.

The mounting may include individually aligning and mounting the plurality of retention devices to at least a selection of wheel stud openings defined in the nave plate of the wheel rim.

The pressing may include placing the wheel rim onto the wheel hub and pressing the wheel rim onto the wheel hub such that the wheel studs protrude through at least the selection of corresponding wheel stud openings defined in the wheel rim and are engaged by the associated retention devices.

In some embodiments, the method may further include fastening wheel lugs on the protruding wheel studs not associated with retention devices to securely fasten the wheel rim relative to the wheel hub.

In some embodiments, the method may further include individually removing and replacing each retention device with a wheel lug.

Each retention device may be individually removed using a disengagement member or custom removal tool as previously described.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 1 to 6 show a retention device (100) according to embodiments of the present invention for retaining a wheel rim (800; shown only in FIGS. 5 and 6) relative to a wheel hub (900; shown only in FIG. 6) having wheel studs (910; shown only in FIG. 6) extending therefrom.

Figure 1:
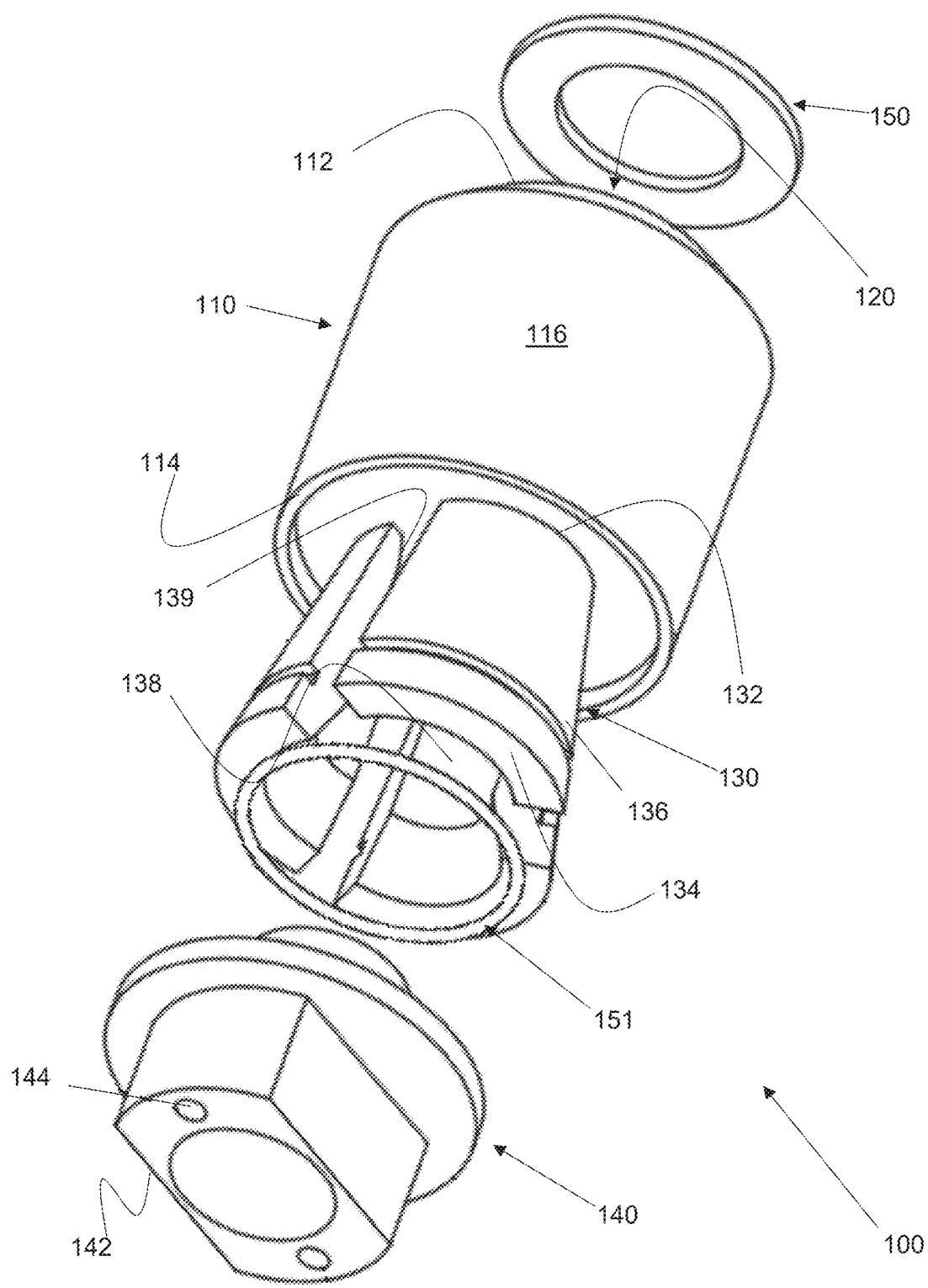
FIG. 1 is an exploded view of a retention device according to an embodiment of the present invention.

Referring to FIG. 1, the retention device (100) includes a body (110) having a mounting end (112), an opposed outer end (114) and a receiving opening (120) between and through the mounting end (112) and the outer end (114), said receiving opening (120) configured to at least partially receive a wheel stud (910; not shown) therein.

The device (100) further includes a plurality of wedge elements (130) aligned and arranged within the body (110) to engage with the wheel stud (910; not shown); and a socket end member (140) connectable to the outer end (114) for enclosing the wedge elements (130) within the body (110).

Lastly, the device (100) includes a magnetic member (150) positioned at the mounting end (112) for magnetically mounting the device (100) to a nave plate of a wheel rim (800; not shown) over a wheel stud opening (810; not shown).

As shown, the body (110) has a circular cross-sectional shape defined by a single curved sidewall (116) extending between the mounting end (112) and the outer end (114).

Figure 2:
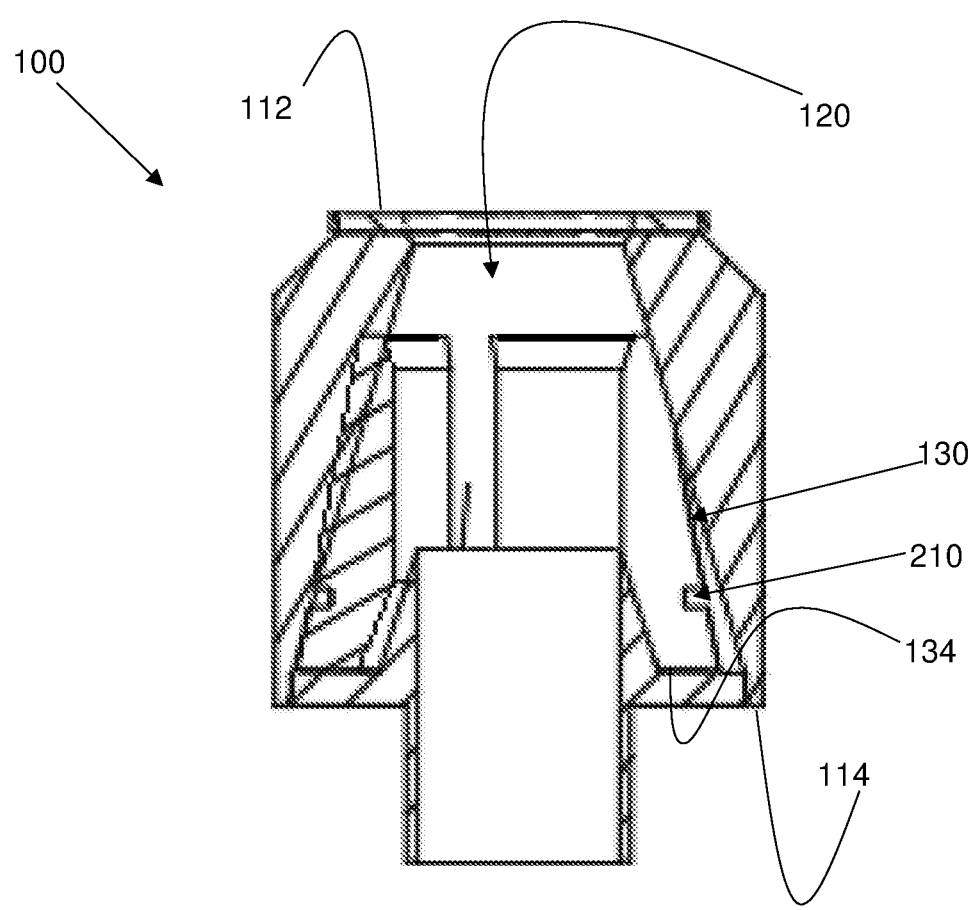
FIG. 2 is a sectional view of the retention device as shown in FIG. 1.

Referring briefly to FIG. 2, the receiving opening (120) tapers in diameter from the outer end (114) to the mounting end (112).

Referring back to FIG. 1, the plurality of wedge elements (130) are configured to be aligned and arranged within the receiving opening (120) of the body (110) for engaging with a wheel stud (910; not shown) received therein.

Each wedge element (130) includes a tip (132), an opposed base (134) and a wedge body (136) extending therebetween.

As shown, the tip (132) is configured to be arranged at or near the mounting end (112) of the body (110). Likewise, the base (134) is configured to be arranged at or near the outer end (114) of the body (110).

The wedge body (136) includes an inner wall, an opposed outer wall and a pair of opposed sidewalls extending longitudinally between the tip (132) and the base (134). The inner wall includes a concave surface (138) defined thereon.

Each wedge element (130) tapers in width from the base (134) to the tip (132) so as to enable the wedge elements (130) to be arranged about a periphery of the receiving opening (120) in a side-by-side arrangement.

Each wedge element (130) further include a plurality of grooves defined on the concave surface (138).

The grooves extend across the concave surface (138) of the wedge elements (130) in a lateral direction extending at least partially between the opposed sidewalls. The grooves are adapted to match an external thread on a wheel stud (910; not shown).

When aligned relative to each other, the grooves on the wedge elements (130) combine to form an internal thread adapted to threadingly engage with an external thread of a wheel stud (910; not shown).

Each wedge element (130) further includes a chamfer (139) at the tip (132) to guide an external thread of a wheel stud (910; not shown) during engagement. The chamfer (139) is configured to guide and align the wheel stud (910; not shown) as it is received in the receiving opening (120) relative to the wedge elements (130).

As shown, the wedge elements (130) are arranged within the body (110) for engaging with a wheel stud (910; not shown) in a side-by-side arrangement about a periphery of the receiving opening (120).

The wedge elements (130) are configured to be axially movable relative to the body (110) and the receiving opening (120) to expand and fit about a wheel stud (910; not shown), when, e.g., the retaining device (100) is axially pressed towards a wheel hub (900; not shown) over the wheel stud (910; not shown). Advantageously, this enables the device (100) to be readily fitted over a protruding wheel stud (910; not shown) without the need to screw the device (100) over the external thread of the wheel stud (910; not shown).

Due to the tapered receiving opening (120), the wedge elements (130) are conversely configured to constrict about a wheel stud (910; not shown) when the device (100) is axially moved or pulled away from the wheel stud (910; not shown) to thereby advantageously retain a wheel rim (800; not shown) relative to a wheel hub (900; not shown).

The device (100) further includes a biasing member in the form of a coil spring located between the wedge element (130) and the inner surface of the socket end member (140) for biasing the wedge elements (130) towards the mounting end (112) of the body (110). The biasing member provides a biasing force, so that axial movement of the wedge elements (130) towards the outer end (114) acts against the biasing force and movement of the wedge elements (130) towards the mounting end (112) acts under the force of the biasing member.

The device (100) further includes an alignment member in the form of an O-ring (151) for aligning the wedge elements (130) relative to each other in the body (110) in a side-by-side arrangement about a periphery of the receiving opening (120).

Best shown in FIG. 2, each wedge element (130) includes a retaining groove (210) for at least partially receiving the O-ring (151; not shown) and aligning the wedge elements (130) relative to each other. The retaining groove (210) is defined in the outer wall at or near the base (134). The grooves (210) substantially align in the wedge elements (130).

Referring again to FIG. 1, the socket end member (140) is connectable to the outer end (114) for enclosing the wedge elements (130) within the body (110).

The socket end member (140) defines an external socket formation (142) for engaging with a torque applying tool and includes one or more locating holes (144) defined therein.

The locating holes (144) are positioned to align a disengagement member received therethrough relative to the wedge elements (130) for fixing the wedge elements (130) against rotational movement relative to the body (110) and thereby enable the device (100) to be threaded free of a wheel stud (910; not shown) with the torque applying tool, for example.

Figure 3:
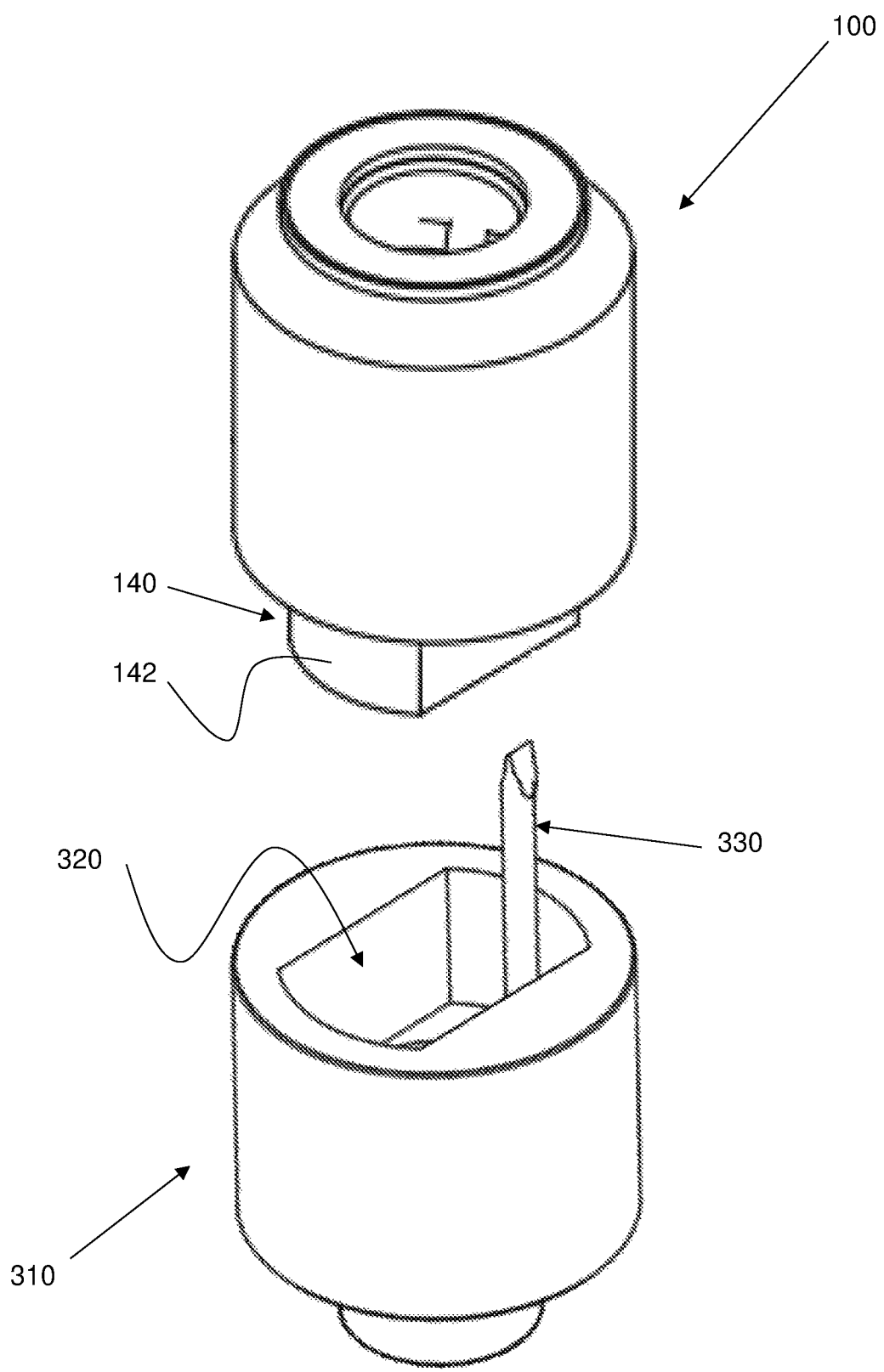
FIG. 3 is a perspective view of the retention device as shown in FIGS. 1 and 2 together with a custom removal tool according to an embodiment of the present invention.

Referring to FIG. 3, in this embodiment, the figure shows the device (100) together with a custom removal tool (310) for removal of the device (100) from a wheel stud (910; not shown).

The custom removal tool (310) includes a socket engagement member (320) and a disengagement member (330) extending upwardly from the socket engagement member (320) and configured to be received in one of the locating holes (144; not visible) of the socket end member (140) of the device (100) when the socket engagement member (320) engages with the external socket formation (142).

Figure 4A:
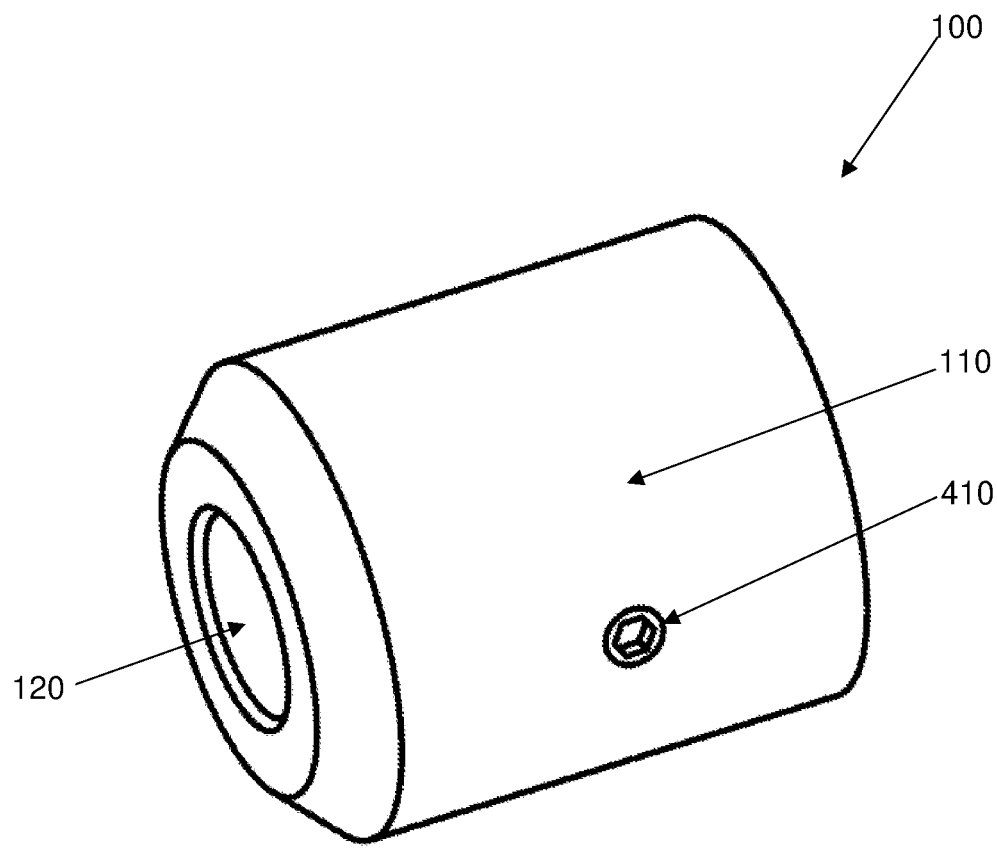
FIGS. 4A and 4B respectively show parts of a retention device according to another embodiment of the present invention.
Figure 4B:
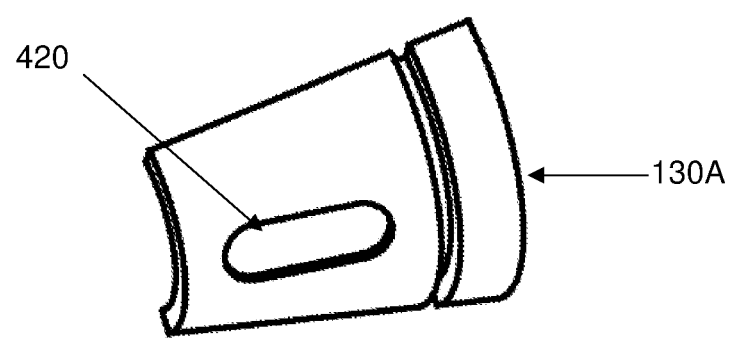

Referring to FIGS. 4A and 4B, in another embodiment, the device (100; shown only in FIG. 4A) includes a disengagement member in the form of a grub screw (410; shown in FIG. 4A) received through an opening in a side of the body (110; shown only in FIG. 4A) and an opening (420; shown only in FIG. 4B) defined in one of the wedge elements (130A; shown only in FIG. 4B).

In use, the grub screw (410; shown in FIG. 4A) is tightened relative to the body (110; shown only in FIG. 4A) for fixing the wedge element (130A; shown only in FIG. 4B) and thereby all the wedge elements (130) against rotational movement relative to the body (110; shown only in FIG. 4A) to enable the device (100; shown only in FIG. 4A) to be threaded free of a wheel stud (910; not shown).

When tightened, the grub screw (410; shown only in FIG. 4A) protrudes into the receiving opening (120; shown only in FIG. 4A) and into the opening (420; shown only in FIG. 4B) defined in the wedge element (130A; shown only in FIG. 4B) to thereby fix all the wedge elements (130) against rotational movement relative to the body (110; shown only in FIG. 4A).

Referring back to FIG. 1, the magnetic member (150) is a ring-shaped magnet located about a periphery of the receiving opening (120) defined on the mounting end (112) and configured to magnetically mount the device (100) over a wheel stud receiving opening (810) defined in a wheel rim (800; not shown).

A method of using the device (100) as shown in FIGS. 1, 2, 3, 4A and 4B for fixing a wheel rim (800) relative to a wheel hub (900) is now described in detail with reference to FIGS. 5 and 6.

Figure 5:
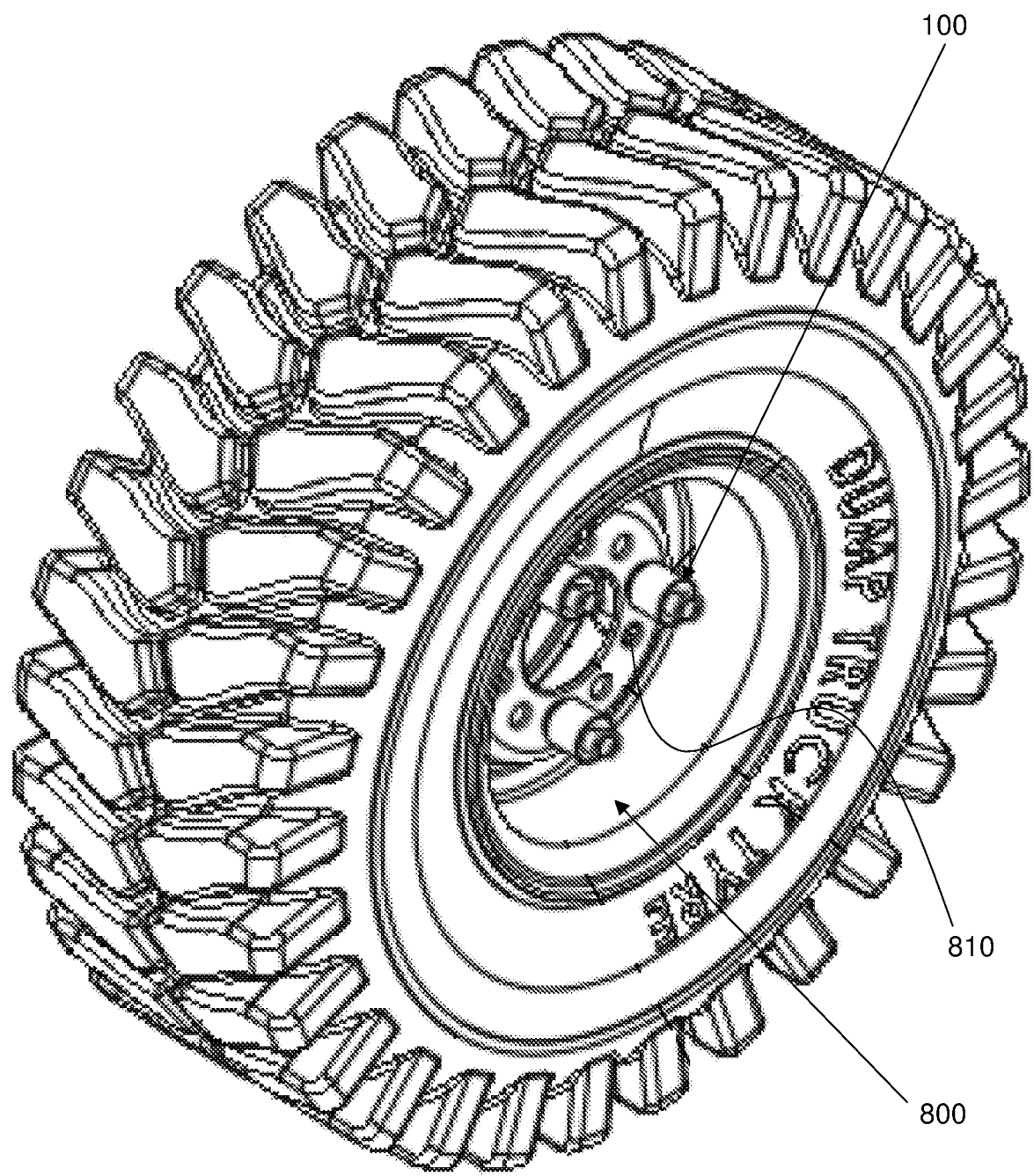
FIG. 5 is a perspective view of a plurality of retention devices each as shown in FIG. 1 attached to a wheel rim during fitting.

Referring to FIG. 5, retention devices (100) are magnetically mounted over a selection of wheel stud openings (810) defined in the nave plate of the wheel rim (800). A person skilled in the art will appreciate that it may not be necessary to employ a retention device (100) on every wheel stud opening (810).

Each retention device (100) is individually mounted by aligning the magnetic member (150; not visible) relative to a selected wheel stud opening (810). The device (100) is then pressed relative to the opening (810) such that the magnetic member (150; not visible) is attracted to the nave plate and holds the device (100) in place.

Figure 6:
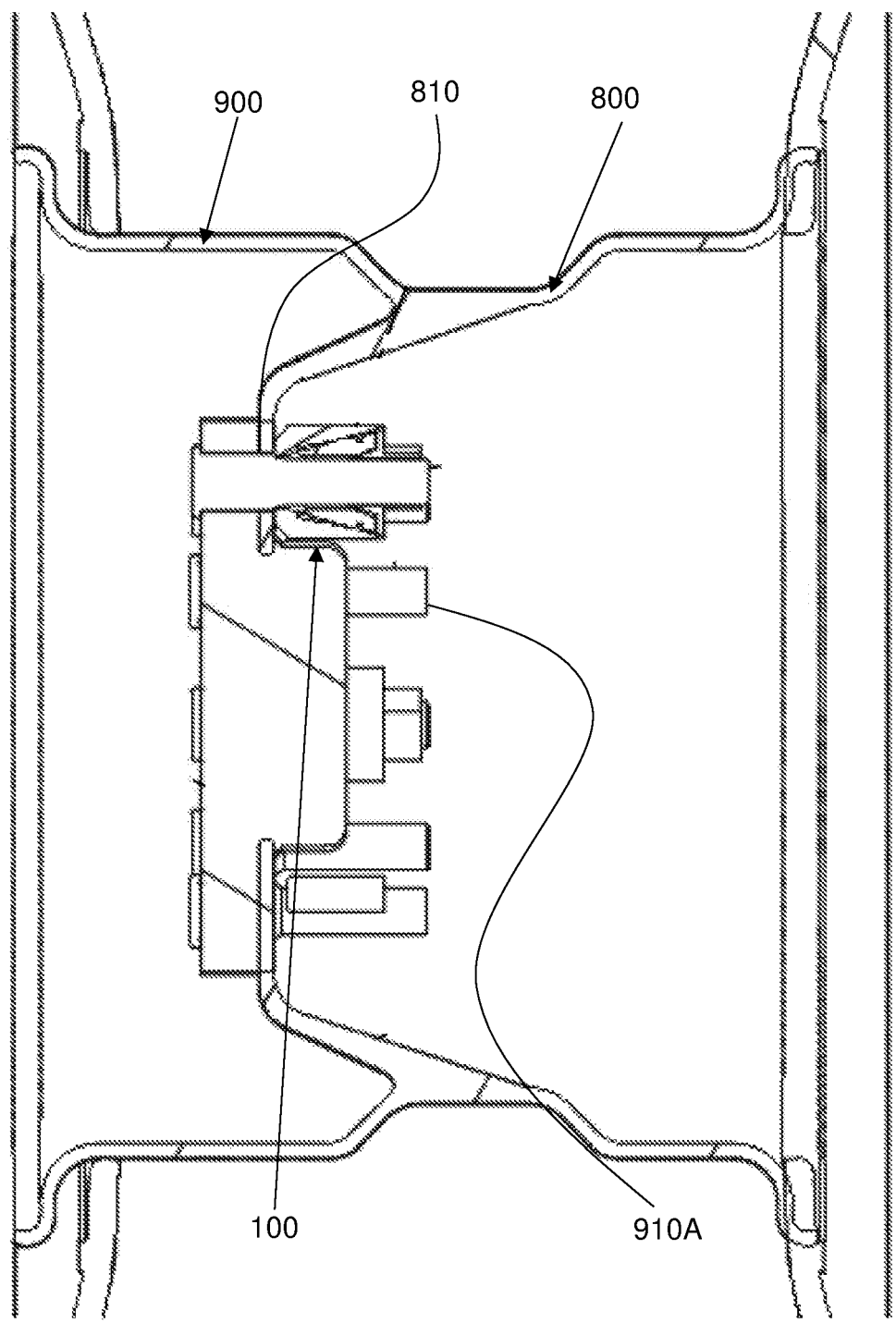
FIG. 6 is a sectional view of retention devices each as shown in FIG. 1 when located on a wheel rim attached to a wheel hub.

Referring to FIG. 6, the wheel rim (800) is then aligned relative to the wheel hub (900) and mounted to the wheel hub (900) such that the wheel studs (910) extending from the wheel hub (900) protrude through the wheel stud openings (810) defined in the wheel rim (800).

The wheel rim (800) is then pressed against the wheel hub (900) such that the wheel studs (910) protruding through the selection of corresponding wheel stud openings (810) are engaged by the associated retention devices (100) to retain the wheel rim (800) relative to the wheel hub (900).

The wheel rim (800) can then be secured in place by fastening wheel lugs to the non-engaged wheel studs (910A) and then individually removing and replacing each retention device (100) with a wheel lug.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A retention device for retaining a wheel rim relative to a wheel hub having at least one wheel stud extending therefrom, said device comprising:
   a body having a mounting end and an opposed outer end and defining a receiving opening extending from the mounting end at least partially towards the outer end, said receiving opening configured to at least partially receive the wheel stud therein;
   a plurality of wedge elements aligned and arranged within the body to engage with the wheel stud; and
   at least one continuous ring-shaped magnetic member located about a periphery of the receiving opening, said continuous ring-shaped magnetic member configured to magnetically mount the retention device to a nave plate of a wheel rim and to align the receiving opening of the device relative to an opening defined in the nave plate for receiving the at least one wheel stud therethrough.

2. The device of claim 1, wherein each of the wedge elements are aligned relative to the body with a tip of the element located towards the mounting end and a base of the element located towards the outer end.

3. The device of claim 2, wherein each wedge element comprises an inner concave surface and a plurality of grooves defined thereon, said plurality of grooves adapted to match an external thread of the wheel stud.

4. The device of claim 3, wherein the plurality of grooves on the wedge elements combine to form an internal thread adapted to engage with the external thread of the wheel stud.

5. The device of claim 1, wherein the wedge elements are axially moveable relative to the body and the receiving opening to expand and fit about the wheel stud when the device is pressed towards the wheel hub.

6. The device of claim 1, wherein the wedge elements are axially moveable relative to the body and the receiving opening to constrict about the wheel stud when the device is moved away from the wheel hub to prevent disengagement from the wheel stud.

7. The device of claim 1, further comprising a biasing member or mechanism for biasing the plurality of wedge elements towards the mounting end.

8. The device of claim 7, wherein the biasing member or mechanism is a spring located between the wedge elements and the outer end so that axial movement of the wedge elements towards the outer end acts against a biasing force of the biasing member or mechanism.

9. The device of claim 1, further including an alignment member for aligning the plurality of wedge elements relative to one another within the body.

10. The device of claim 1, wherein the wedge elements each comprise a chamfer at a tip for guiding and aligning the wheel stud when received in the receiving opening relative to the wedge elements.

11. The device of claim 1, further comprising a disengagement member for disengaging the plurality of wedge elements from the wheel stud.

12. The device of claim 11, wherein the disengagement member is a fastener configured to be received through an opening defined in a side of the body or the outer end for fixing the wedge elements relative to the body and enabling the device to be threaded free of the wheel stud.

13. The device of claim 12, wherein the disengagement member is at least partially received in one of the plurality of wedge elements for fixing the wedge elements relative to the body.

14. The device of claim 11, wherein the outer end defines an external socket formation for engaging with a torque applying tool and comprises an opening for receiving the disengagement member therethrough for fixing the wedge elements relative to the body and enabling the device to threaded free of the wheel stud.

15. The device of claim 1, wherein the receiving opening extends entirely through the mounting end and the opposed outer end.

16. The device of claim 15, further comprising a socket end member connectable to the outer end for retaining the plurality of wedge elements in the body, said socket end member comprising an external socket formation and at least one locating hole.

17. The device of claim 16, further comprising a custom removal tool configured to engage with the socket end member for disengagement of the device from the wheel stud.

18. The device of claim 17, wherein the custom removal tool comprises a locating pin configured to be received in the locating hole for fixing the wedge elements relative to the body.

19. A method of retaining a wheel rim during fitting, said method comprising:
mounting a plurality of retention devices according to claim 1 to a nave plate of the wheel rim; and
pressing the wheel rim onto a wheel hub such that each of the plurality of retention devices aligns and engages with a respective wheel stud extending from the wheel hub and retains the wheel rim relative to the wheel hub.

20. The method of claim 19, further comprising individually removing and replacing each retention device with a wheel lug.

* * * * *